Aug. 5, 1924.
J. THOMPSON
LOCKING BUNG
Filed Aug. 29, 1923
1,503,726
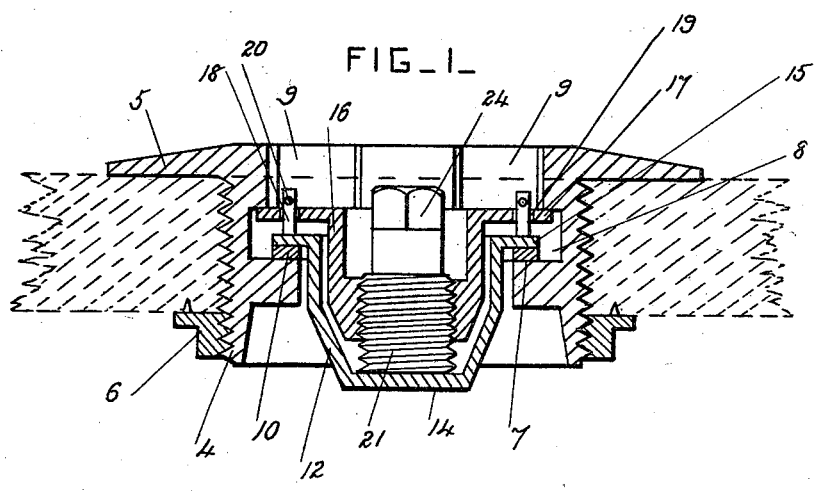
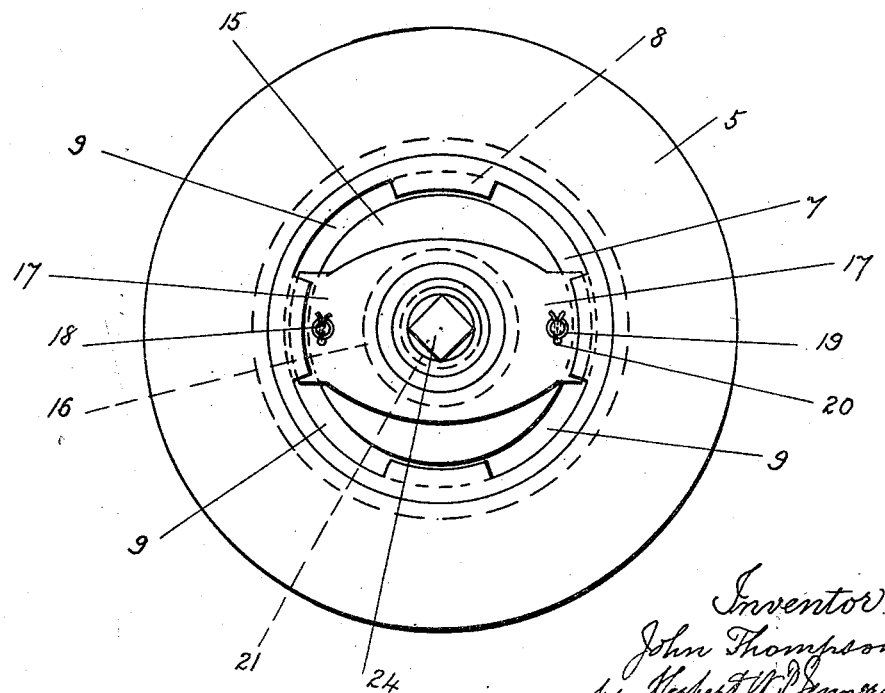
Inventor
John Thompson
by Herbert W. Jenner
Attorney Patented Aug. 5, 1924.

1,503,726

UNITED STATES PATENT OFFICE.

JOHN THOMPSON, OF CHILTON, WISCONSIN, ASSIGNOR OF ONE-HALF TO GEORGE C. HUME, OF CHILTON, WISCONSIN.

LOCKING BUNG.

Application filed August 29, 1923. Serial No. 659,917.

*To all whom it may concern:*

Be it known that I, JOHN THOMPSON, a citizen of the United States, residing at Chilton, in the county of Calumet and State of Wisconsin, have invented certain new and useful Improvements in Locking Bungs, of which the following is a specification.

This invention relates to locking bungs for use in connection with barrels or other similar vessels; and it consists in the novel construction and combination of the parts hereinafter fully described and claimed whereby the bung body is held locked in airtight engagement with the bung bushing.

In the drawings, Figure 1 is a vertical section through a bung constructed according to this invention. Fig. 2 is a plan view of the same.

A bung bushing 4 is provided having an external flange 5 at one end, and this bushing is screwthreaded externally. A locking nut 6 is screwed on the other end portion of the bushing from the flange, and secures the bushing to the barrel. As shown, the bushing is adapted for use with a wooden barrel, and when applied to a metal barrel the bushing is suitably modified.

The bung bushing is provided with an internal annular seat 7, and an undercut groove 8 above the seat. Notches 9 are formed in the upper part of the bushing to afford access to the groove. A packing washer 10 of india rubber or other similar material is placed on the seat 7.

The bung body 12 is hollow. Its upper part is cylindrical, and its lower part is slightly conical. It has a bottom 14, and an external projecting flange 15 at its top which rests on the packing washer 10. The flange 15 is circular, and is small enough to pass through the upper part of the bushing. The bung body passes through the annular seat, and the flange 15 overlaps it. A follower 16 is provided, and has lateral projections 17 at its top which are shaped and proportioned so that they can pass through the notches 9 and engage with the undercut groove 8 when turned around out of line with the notches 9. The flange 15 on the bung body is provided with vertical pins 18 which project upwardly through holes 19 in the projections 17, so that the bung body and its follower revolve together but are free to move axially. Split keys 20 are inserted in holes in the upper parts of the pins 18 to prevent the follower from being wholly separated from the bung body. A screw 21 is screwed into a hole in the lower part of the follower 16 which is arranged inside the hollow bung body, and this screw has a rectangular portion 24 at its upper part which is operated by any suitable wrench.

When the parts have been placed in the positions shown in the drawings, the screw 21 is screwed down against the bottom 14 of the bung body, so that the packing washer 10 is compressed between the seat 7 and the flange 15 of the bung body, and the cask is thereby tightly closed, and the bung body is locked in the bung bushing.

What I claim is:

1. In a locking bung, a bung bushing provided with an annular seat and an undercut locking groove, a bung body provided with a flange which overlaps the said seat, a packing washer interposed between the said flange and seat, a follower provided with lateral projections which engage with the undercut groove, and a locking screw engaging with the follower and bearing on the bung body and operating to compress the packing washer between the flange and seat.

2. In a locking bung, a bung bushing provided with an annular seat and an undercut locking groove, a bung body provided with a flange which overlaps the said seat, a packing washer interposed between the said flange and seat, a follower provided with lateral projections which engage with the undercut groove, pins connecting the bung body and follower so that they revolve together and are free to slide axially, and a locking screw engaging with the follower and bearing on the bung body and operating to compress the packing washer between the flange and seat.

3. In a locking bung, a bung bushing provided with an annular seat and an undercut locking groove, a hollow bung body which projects through the annular flange and which has a flange that overlaps it, a packing washer interposed between the said flange and seat, a follower arranged inside the bung body and provided with lateral projections which overlap the flange of the bung body and engage with the undercut groove, and a locking screw screwed into the follower and bearing on the bottom of the bung body.

4. A locking bung as set forth in claim 3, and having pins connecting the bung body and follower so that they revolve together and are free to slide axially.

In testimony whereof I have affixed my signature.

JOHN THOMPSON.